United States Patent

Takamiya et al.

[11] Patent Number: 6,150,455
[45] Date of Patent: Nov. 21, 2000

[54] THERMOSTABLE POLYMER ELECTROLYTE GEL

[75] Inventors: Hiroyuki Takamiya, Okayama; Ryosuke Nishida, Oku-gun; Tatsuaki Sumitani, Akashi, all of Japan

[73] Assignees: Toyo Boseki Kabushiki Kaisha; Japan Exlan Company, Ltd., both of Osaka, Japan

[21] Appl. No.: 08/963,832

[22] Filed: Nov. 4, 1997

[30] Foreign Application Priority Data

Nov. 7, 1996 [JP] Japan ................................ 8-295559

[51] Int. Cl.$^7$ ............................................. C08L 9/02
[52] U.S. Cl. ........................... 524/566; 524/166; 524/168; 524/185; 524/401; 524/404; 524/408; 524/565; 428/522
[58] Field of Search ...................... 524/565, 566, 524/401, 404, 166, 168, 185, 408; 428/522

[56] References Cited

U.S. PATENT DOCUMENTS 4,228,056 10/1980 Stoy ........................................ 526/221
4,972,019 11/1990 Obayashi et al. ......................... 524/83
5,658,686 8/1997 Akashi ..................................... 429/190

*Primary Examiner*—Judy M. Reddick
*Attorney, Agent, or Firm*—Kenyon & Kenyon

[57] ABSTRACT

A thermostable polymer electrolyte gel containing an acrylonitrile polymer, an electrolyte and a solvent, the acrylonitrile polymer having an acrylonitrile content of from 89 wt % to 98 wt % and meeting the following relationship:

$$1{,}040{,}000 - (A \times 10{,}000) \leq B \leq 1{,}490{,}000 - (A \times 10{,}000)$$

where A is the acrylonitrile content in wt % and B is the weight average molecular weight of the acrylonitrile polymer, the polymer electrolyte gel having an ion conductivity of $10^{-3}$ S/cm or higher at 20° C., exhibiting the "retention of shape" in a thermostability test, and containing the acrylonitrile polymer in a proportion of from 3 wt % to 9 wt %. The thermostable polymer electrolyte gel can be produced by dissolving an acrylonitrile polymer and an electrolyte in a solvent to prepare a solution of the polymer, and cooling the polymer solution to a temperature of 0° C. or lower.

3 Claims, No Drawings

THERMOSTABLE POLYMER ELECTROLYTE GEL

FIELD OF INVENTION

The present invention relates to a polymer electrolyte gel and a process for its production. More particularly, it relates to a thermostable polymer electrolyte gel having high ion conductivity and thermostability both satisfactory for practical use, and a process for its production.

BACKGROUND OF THE INVENTION

Many kinds of electrolytic solutions containing an electrolyte such as KOH, $LiBF_4$ or $LiClO_4$ dissolved in water or an organic solvent have hitherto been practically used in electrochemical devices such as electric batteries, display elements and sensors. These electrolytic solutions have high ion conductivity and come into good contact with electrodes.

There is, however, always a possibility that electrochemical devices produced with an electrolytic solution may cause liquid leaking because the electrolytic solution is in a liquid state; they are, therefore, required to have a structure for sealing the electrolytic solution therein. Further problems have been found in these electrochemical devices, such as difficulties in the production of sheet-shaped lightweight devices.

In recent years, various inorganic solid electrolytes have been known, such as $RbAg_4I_5$, $Na_2O.MgO.5Al_2O_3$, $Na_2O.5Ga_2O_3$, $Na_2O.11Al_2O_3$ and $Li_3N$. These inorganic solid electrolytes can solve the above problems of electrochemical devices, such as liquid leaking. They, however, have different problems such as weak adhesion to electrodes and difficulties in the formative working.

Much attention has been paid to polymer solid electrolytes as the material for electrochemical devices, which may solve all these problems. The use of a polymer solid electrolyte changes the above electrochemical devices into all solid-state devices having no fluidity as derived from electrolytic solutions. In addition, the viscoelasticity of a polymer in the polymer solid electrolyte can solve the above problems on the adhesion to electrodes and the workability. The polymer solid electrolyte also serves, when disposed between electrodes, as a separating film for these electrodes, and can be formed to have a thickness of 1 mm or less. For these reasons, there has been a great demand for polymer solid electrolytes with higher efficiency for electrochemical devices, and many studies for their development have been extensively made in the art.

For example, in the production of a secondary battery, the use of an inorganic solid electrolyte may cause a change in the shape of a positive electrode active material of the battery with the progress of an electric charge or discharge reaction, which gives a strain at the electrode-and-electrolyte interface and causes a lowering in the performance of the secondary battery. In contrast, polymer solid electrolytes themselves have flexibility, so that they can follow any change in the shape of a positive electrode active material and can have satisfactory electric charge and discharge characteristics. The polymer solid electrolytes can also be integrated to a high degree by making them thinner and they have, therefore, been expected to find applications as the material to produce power supplies for automobiles or for domestic use.

Furthermore, when a conventional electrolytic solution is used in a secondary battery using metal lithium, repeated cycles of electric charge and discharge make lithium dendrites formed in the electrolytic solution. The formation of dendrites causes serious problems such as short circuit and rupture of the secondary battery; therefore, no metal lithium secondary batteries have been put to practical use. In contrast, when a polymer solid electrolyte is used in a secondary battery using metal lithium, the polymer solid electrolyte prevents the formation of lithium dendrites or gives no such formation at all; therefore, polymer solid electrolytes have been greatly expected as the material for metal lithium secondary batteries.

Electrochromic displays are known as another example of the electrochemical device using an electrolytic solution, an inorganic solid electrolyte or a polymer solid electrolyte. The electrochromic displays exhibit the behavior of reversible color development and extinction by the electrochemical oxidation-reduction reaction. The electrochromic displays have excellent advantages such as no influence of display angles, good memory properties, simple cell structure and various color tones; they have, therefore, been expected as display elements that can be substituted for liquid crystal display elements.

In the electrochromic display, for example, a polymer solid electrolyte having high ion conductivity in the shape of a film can be used in combination with a layer made of a material exhibiting the behavior of reversible color development and extinction (e.g., tungsten oxide, Prussian blue, phthalocyanine complex with cobalt). The electrochromic display produced with such a combination is expected to make a good response of color development and extinction.

The polymer solid electrolyte also makes possible the design of all solid-state electrochromic displays in which the adhesion between electrodes and films can always be kept at a high level. The electrochromic displays using polymer solid electrolytes may, therefore, be used under various environments (e.g., those giving continuous vibration, those giving large strain deformation) as compared with the conventional ones.

Electric double layer condensers are known as still another example of the electrochemical device using an electrolytic solution, an inorganic solid electrolyte or a polymer solid electrolyte. The electric double layer condensers have the advantage of having an electrostatic capacity equal to those of the ordinary secondary batteries, in addition to the original advantages of condensers, i.e., long life characteristics, and rapid electric charge and discharge characteristics. In particular, for the electric double layer condensers, much interest has been increasingly given to the production of all solid-state electric double layer condensers from the viewpoints of making them thinner, improving the productivity and preventing the leaking of any liquid component such as an electrolytic solution. In the production of such all solid-state electric double layer condensers, the production of a polymer solid electrolyte having an ion conductivity equal to that of an electrolytic solution has been desired to improve the adhesion to electrodes and to keep the rapid electric charge and discharge characteristics.

Many studies have been made of polymer solid electrolytes. For example, a polymer solid electrolyte with a polyether such as polyethylene oxide is described in J. Amer. Chem. Soc., 21, 648(1988). This is a solid electrolyte of the type (polyether type) in which ions entrapped in the polymer chains migrate according to the thermal motion (segment motion) of the polymer chains.

In the polymer solid electrolytes of the polyether type, however, ion conductivity at around room temperature, which is generally most required, has been difficult to become higher than $10^{-4}$ S/cm.

Therefore, an improvement of the ion conductivity at around room temperature has required the use of a lower molecular weight polyether or the softening of a polyether itself. Such a lowering in the molecular weight or softening has deteriorated the mechanical strength of a polymer solid electrolyte and made it difficult to withstand actual use.

Some polymer solid electrolytes made of a polar polymer such as polyacrylonitrile and an electrolytic solution containing an electrolyte dissolved in an organic solvent (i.e., so-called polymer electrolyte gels) are described in J. Polym. Sci., 27, 4191(1982), J. Polym. Sci. Polym. Phys. Ed., 21, 939(1983), J. Electrochem. Soc., 137, 1657 (1990), JP-A 4-306560, JP-A 7-45271 and JP-A 7-82450. A polymer electrolyte gel made of a polar polymer such as poly(methyl methacrylate) and an electrolytic solution containing an electrolyte dissolved in an organic solvent is disclosed in JP-B 58-56467. Furthermore, a polymer electrolyte gel made of an acrylonitrile copolymer, a polyalkylene oxide and an electrolytic solution containing an electrolyte dissolved in an organic solvent is disclosed in JP-A 7-37419.

These polymer electrolyte gels have relatively higher ion conductivity than that of the above polymer solid electrolytes with polyethers; they, however, contain a polar polymer in a concentration of about 12 wt % or higher, so that the amount of an electrolyte that can dissolve in the electrolytic solution is inevitably decreased and they have an ion conductivity only about one fifth that obtained by the single use of an electrolytic solution.

The ion conductivity of such a polymer electrolyte gel may be improved by decreasing the concentration of a polar polymer contained therein and thereby increasing the concentration of an electrolyte. However, if the concentration of a polar polymer is about 10 wt % or lower, the polymer electrolyte gel cannot retain the shape in the range of temperature enough to withstand practical use (e.g., $-20°$ C. to $80°$ C.; this is the temperature range found in automobiles). At a temperature ranging from $50°$ C. to $80°$ C., for example, some problems arise, such as liquefaction of the polymer electrolyte gel and separation between the polar polymer and the electrolytic solution because the polar polymer in the polymer electrolyte gel cannot carry the electrolytic solution. Thus, the advantages of the polymer electrolyte gel are lost at high temperatures, so that the polymer electrolyte gel exposed to high temperatures becomes unstable for long-term use and cannot be provided with satisfactory reliability.

The polymer electrolyte gel with a polar polymer is produced, for example, by casting. The casting is achieved by a process (of volatilization and concentration) in which a polar polymer is dissolved in an electrolytic solution containing a volatile organic solvent such as acetonitrile (or a polar polymer is dissolved in an ordinary electrolytic solution, which is then diluted with a volatile organic solvent), and the resulting solution is then spread over the surface of a flat plate, and the volatile organic solvent is evaporated under reduced pressure with heating or under atmospheric pressure to give a concentrated polymer-containing electrolytic solution, thereby causing gelation. This process, however, has serious problems of safety, such as outbreak of fires and induction of toxic symptoms in handling persons, because the step of evaporating a volatile organic solvent is involved as an essential step, and this process further has its own problem that polymer electrolyte gels cannot be produced in the shape of a thin film having a large surface area; therefore, this process cannot be practically applied to industrial use.

The polymer solid electrolyte containing a polymer electrolyte gel, when used in portable instruments such as thin-shaped batteries, is generally required to have a thickness of 500 $\mu$m or less, preferably 100 $\mu$m or less. In addition, the polymer solid electrolyte, when used in electrochemical devices such as sensors, is not particularly limited to the shape of a film, but is required to have workability into various shapes.

SUMMARY OF THE INVENTION

Under these circumstances, the present inventors have extensively studied to develop a thermostable polymer electrolyte gel having high ion conductivity, retaining the shape of a solid even at high temperatures, e.g., $80°$ C., exhibiting no phase separation between the liquid components and the solid components, having both elasticity enough for adhesion to electrodes and strength enough to withstand formative working, and further having workability into various shapes with their suitable thickness; and a process for producing such a polymer electrolyte gel in an industrially advantageous and safe manner, thereby completing the present invention.

Thus, the present invention provides a thermostable polymer electrolyte gel comprising an acrylonitrile polymer, an electrolyte and a solvent, the acrylonitrile polymer containing an acrylonitrile content of from 89 wt % to 98 wt % and meeting the following relationship:

$$1{,}040{,}000-(A\times10{,}000) \leq B \leq 1{,}490{,}000-(A\times10{,}000)$$

where A is the acrylonitrile content in wt % and B is the weight average molecular weight of the acrylonitrile polymer; the polymer electrolyte gel having an ion conductivity of $10^{-3}$ S/cm or higher at $20°$ C., exhibiting the "retention of shape" in a thermostability test, and containing the acrylonitrile polymer in a proportion of from 3 wt % to 9 wt %.

The thermostable polymer electrolyte gel of the present invention is preferably in the shape of a thin film having a thickness of from 1 $\mu$m to 500 $\mu$m.

The above electrolyte preferably contains either cation of a lithium ion and a quaternary ammonium ion and the above solvent is preferably an organic solvent.

The present invention further provides a process for producing a thermostable polymer electrolyte gel, comprising the steps of dissolving an acrylonitrile polymer and an electrolyte in a solvent to prepare a solution of the polymer; and cooling the polymer solution to a temperature of $0°$ C. or lower; the acrylonitrile polymer having an acrylonitrile content of 89 wt % to 98 wt % and meeting the following relationship:

$$1{,}040{,}000-(A\times10{,}000) \leq B \leq 1{,}490{,}000-(A\times10{,}000)$$

where A is the acrylonitrile content in wt % and B is the weight average molecular weight of the acrylonitrile polymer; the polymer electrolyte gel having an ion conductivity of $10^{-3}$ S/cm or higher at $20°$ C., exhibiting the "retention of shape" in a thermostability test, and containing the acrylonitrile polymer in a proportion of from 3 wt % to 9 wt %.

The above acrylonitrile polymer is preferably in the shape of a fiber or a product formed from the fiber.

The step of preparing the polymer solution in the above production process is preferably conducted by adding the electrolytic solution composed of the solvent and the electrolyte to the acrylonitrile polymer disposed on a substrate or a frame.

The cooling step in the above production process is preferably conducted by disposing the polymer solution in the shape of a thin film on the substrate or the frame.

The above production process may, of course, further comprises an additional step of evaporating and removing some part of the above solvent before and/or after the cooling step, i.e., before and/or after the gelation.

DETAILED DESCRIPTION OF THE INVENTION

The thermostable polymer electrolyte gel of the present invention comprises an acrylonitrile polymer, at least one electrolyte and a solvent.

The acrylonitrile polymer used in the present invention is made of acrylonitrile and at least one monomer copolymerizable to the acrylonitrile. In the present invention, the acrylonitrile polymer is not particularly limited to only one kind, but may also be used by a combination of two or more kinds.

The copolymerizable monomer is not particularly limited to specific kinds, so long as the resulting acrylonitrile polymer dissolves in a solvent such as described below. Examples of the copolymerizable monomer are cyano group-containing monomers such as methacrylonitrile; unsaturated carboxylic acids such as acrylic acid, methacrylic acid, maleic acid, itaconic acid and vinylpropionic acid, or their derivatives (e.g., salts such as sodium acrylate, potassium acrylate, ammonium acrylate and sodium methacrylate; acid anhydrides such as maleic anhydride; esters such as methyl acrylate, ethyl acrylate, n-propyl acrylate, isopropyl acrylate, n-butyl acrylate, n-octyl acrylate, 2-ethylhexyl acrylate, methyl methacrylate, ethyl methacrylate and hydroxylethyl methacrylate; amides such as acrylamide, monomethacrylamide, dimethylacrylamide, monoethylacrylamide, mono-t-butylacrylamide, methacrylamide, monomethylmethacrylamide and dimethylmethacrylamide); vinyl halide compounds such as vinyl chloride, vinyl bromide and vinyl fluoride; vinylidene halide monomers such as vinylidene chloride, vinylidene bromide and vinylidene fluoride; vinyl esters such as vinyl formate, vinyl acetate, vinyl monochloroacetate, vinyl dichloroacetate, vinyl trichloroacetate, vinyl monofluoroacetate, vinyl difluoroacetate and vinyl trifluoroacetate; vinyl group-containing acid compounds, or their salts, anhydrides or derivatives, such as p-styrenesulfonic acid, allylsulfonic acid, methallylsulfonic acid, 2-acrylamide-2-methylpropanesulfonic acid, sulfopropyl methacrylate, vinylstearic acid and vinylsulfinic acid; vinyl ethers such as methyl vinyl ether and ethyl vinyl ether; vinyl ketones such as methyl vinyl ketone, ethyl vinyl ketone and phenyl vinyl ketone; vinyl group-containing heterocyclic compounds such as N-vinylpyrrolidone, N-vinylcarbazole, vinylfuran and vinylpyridine; vinylimides such as N-vinylphthalimide and N-vinylsuccinimide; and dienes such as butadiene, isoprene and chloroprene.

In the above copolymerizable monomers, preferably selected are those giving easy gelation because they improve the solubility of an acrylonitrile polymer formed by their copolymerization. Preferred examples of such a monomer are vinylidene chloride, vinyl chloride, vinylidene bromide and vinyl bromide.

The acrylonitrile polymer used in the present invention meets the following relationship:

$$1,040,000-(A \times 10,000) \leq B \leq 1,490,000-(A \times 10,000)$$

where A is the acrylonitrile content in wt % and B is the weight average molecular weight of the acrylonitrile polymer.

The acrylonitrile polymer used in the present invention contains acrylonitrile in a proportion of from 89 wt % to 98 wt %, preferably from 92 wt % to 97.5 wt %, and further contains at least one monomer copolymerizable to the acrylonitrile in a proportion of from 2 wt % to 11 wt %, preferably from 2.5 wt % to 8 wt %.

As can be seen from the above relationship, the weight average molecular weight B of an acrylonitrile polymer used in the present invention is determined by the acrylonitrile content in the above range, i.e., from 89 wt % to 98 wt %.

If the acrylonitrile polymer has an acrylonitrile content of higher than 98 wt %, the solubility of the acrylonitrile polymer in a solvent will be insufficient, even if the acrylonitrile polymer meets the above relationship. The temperature rise to obtain high solubility may often cause polymer degradation and/or coloring into dark brown. In contrast, for the purpose of using relatively lower temperatures at which the acrylonitrile polymer can dissolve in a solvent without degradation, there may be employed a process in which a small amount of the acrylonitrile polymer is dissolved in an electrolytic solution containing a highly volatile solvent at a temperature so low as the polymer does not degrade, and the highly volatile solvent is then removed by evaporation. It is, however, difficult to select such a solvent having good solubility at relatively lower temperatures and safety from an industrial point of view. Even if dissolution is effected at a temperature causing no degradation of the acrylonitrile polymer, it gives no formation of uniform polymer electrolyte gels but only fragile gels. Furthermore, polymer electrolyte gels with the above acrylonitrile polymer containing acrylonitrile in a high concentration cause phase separation between the acrylonitrile polymer and the electrolytic solution composed of an electrolyte and a solvent, when subjected to high temperatures (e.g., 80° C.); and for example, they give no satisfactory gels having viscoelasticity enough for adhesion to electrodes and strength enough to withstand formative working.

If the acrylonitrile polymer has an acrylonitrile content of lower than 89 wt %, the solubility of the acrylonitrile polymer in a solvent will be increased, even if the acrylonitrile polymer meets the above relationship. In such a case, for the purpose of retaining the shape of a polymer electrolyte gel at high temperatures (e.g., 80° C.), the concentration of an acrylonitrile polymer dissolved in a solvent should be increased. As a result, the amount of an electrolyte that can dissolve in a solvent is decreased, and the resulting polymer electrolyte gel cannot have ion conductivity and thermostability both satisfactory for practical use.

In general, the solubility of the polymer in a solvent can be decreased to some extent by increasing the acrylonitrile content to make the polarity of the polymer higher to some extent. In such a case, however, the following problems will arise, so long as the kind or amount of a monomer copolymerizable to acrylonitrile are suitably selected. In other words, an increase in temperature at which the acrylonitrile polymer can dissolve in a solvent causes the coloring of the polymer at the time of dissolution. Alternatively, the solubility of the acrylonitrile polymer becomes high and the concentration of the polymer in the polymer electrolyte gel must be greatly increased; on the other hand, the amount of an electrolyte dissolved in a solvent is decreased and the resulting polymer electrolyte gel has no satisfactory ion conductivity.

When the acrylonitrile polymer does not meet the above relationship because the weight average molecular weight B of the polymer takes too small values, even if the acrylonitrile content A is in the range of from 89 wt % to 98 wt %

(e.g., when A is 89 wt % and B is less than 150,000, or when A is 98 wt % and B is less than 60,000; these values of B can be calculated from the left formula: 1,040,000−(A×10,000) in the above relationship), the following problem will arise. In these cases, the solubility of the acrylonitrile polymer in a solvent becomes high and the resulting polymer electrolyte gel has no satisfactory thermostability. This problem may be solved by increasing the content of the acrylonitrile polymer; however, if this content is increased, the concentration of the electrolyte in the gel is decreased and the resulting polymer electrolyte gel has decreased ion conductivity. Furthermore, another problem will arise that these polymer electrolyte gels are fragile.

When the acrylonitrile polymer does not meet the above relationship because the weight average molecular weight B of the polymer takes too large values, even if the acrylonitrile content A is in the range of from 89 wt % to 98 wt % (e.g., when A is 89 wt % and B is more than 600,000, or when A is 98 wt % and B is more than 510,000; these values of B can be calculated from the left formula: 1,490,000−(A×10,000) in the above relationship), the following problems will arises. In these cases, the acrylonitrile polymer has poor solubility in a solvent, degrades, causes coloring, becomes fragile, and has other drawbacks, so that the polymer electrolyte gel cannot be obtained as a uniform film. In particular, if a film formed from the polymer electrolyte gel is not uniform, the value of ion conductivity may be scattered depending upon the position on the film and such a film has a problem that it becomes opaque. These problems may be solved by dissolving a small amount of the acrylonitrile polymer in an electrolytic solution containing a highly volatile solvent and removing the highly volatile solvent by evaporation to give a gel. It is, however, difficult to select such a solvent having good solubility at relatively lower temperatures and safety from an industrial point of view.

Thus, the weight average molecular weight of the acrylonitrile polymer should be suitably determined by the above relationship.

In general, the solubility of the acrylonitrile polymer in a solvent may also be decreased to some extent by increasing the weight average molecular weight of the polymer. In such a case, however, the temperature at which the polymer can dissolve in a solvent becomes high, and in particular, at temperatures higher than 150° C., the polymer causes coloring into dark brown and degradation.

The thermostable polymer electrolyte gel of the present invention contains an acrylonitrile polymer in a proportion of from 3 wt % to 9 wt %, preferably from 4.5 wt % to 8.5 wt %. The incorporation of the acrylonitrile polymer in such a proportion makes it possible to achieve a higher concentration of the electrolyte contained in the gel. As a result, the thermostable polymer electrolyte gel of the present invention can be provided with higher ion conductivity. If the proportion of acrylonitrile polymer is lower than 3 wt %, the resulting polymer electrolyte gel will lose thermostability. If the proportion of acrylonitrile polymer is higher than 9 wt %, the concentration of an electrolyte that can dissolve in a solvent will be decreased to cause the lowering of ion conductivity.

In general, for the purpose of reducing the solubility of an acrylonitrile polymer to some extent, the stereoregularity of the polymer may be controlled. Although some reports have been made on the control of the stereoregularity of an acrylonitrile polymer, it is difficult to obtain an acrylonitrile polymer satisfactory from industrial points of view, such as productivity, production costs and quality stability.

The electrolyte used in the present invention is any substance generally used as an electrolyte, and it is not particularly limited, so long as it is a substance soluble, together with an acrylonitrile polymer, in a solvent as described below. One or more electrolytes in combination can be used. Examples of the electrolyte used in the present invention are $AgClO_4$, $AgNO_3$, $AlCl_3$, $CuCl_2$, $HNO_3$, KCl, KI, $KPF_6$, KSCN, $LiAsF_6$, $Li_2B_{10}Cl_{10}$, $LiBF_4$, LiBr, $LiCF_3SO_3$, $LiC_4F_9SO_3$, $LiClO_4$, LiI, $LiN(SO_2CF_3)_2$, $LiPF_6$, LiSCN, lithium stearylsulfonate, $MgCl_2$, $Mg(ClO_4)_2$, $NaBF_4$, NaBr, $NaClO_4$, NaI, NaSCN, $NaPF_6$, sodium octylsulfonate, sodium dodecylbenzenesulfonate, $NH_4AsF_6$, $NH_4BF4$, $NH_4Br$, $NH_4CF_3SO_3$, $NH_4ClO_4$, $NH_4I$, $NH_4PF_6$, $NH_4SCN$, $ZnCl_2$, $(C_2H_5)_4NAsF_6$, $(C_2H_5)_4NBF_4$, $(C_2H_5)_4NBr$, $(C_2H_5)_4NCF_3SO_3$, $(C_2H_5)_4$, $NClO_4$, $(C_2H_5)_4NI$, $(C_2H_5)_4NPF_6$, $(C_2H_5)_4NSCN$, $(C_4H_9)_4NAsF_6$, $(C_4H_9)_4NBF_4$, $(C_4H_9)_4NBr$, $(C_4H_9)_4NCF_3SO_3$, $(C_4H_9)_4NClO_4$, $(C_4H_9)_4NI$, $(C_4H_9)_4NPF_6$ and $(C_4H_9)_4NSCN$.

The electrolyte used in the present invention preferably contains, depending upon the purpose of use, either cation of a lithium ion and an ammonium ion in particular.

For example, when the thermostable polymer electrolyte gel of the present invention is used in an electrochemical device with an electrode of a lithium-containing substance, such as a lithium ion secondary battery or a metal lithium secondary battery, the cation in the electrolyte is preferably a lithium ion. Preferred examples of such a lithium ion-containing electrolyte are $LiAsF_6$, $Li_2B_{10}Cl_{10}$, $LiBF_4$, LiBr, $LiCF_3SO_3$, $LiC_4F_9SO_3$, $LiClO_4$, LiI, $LiN(SO_2CF_3)_2$, $LiPF_6$, LiSCN and lithium stearylsulfonate.

When the thermostable polymer electrolyte gel of the present invention is used in an electrochemical device such as an electric double-layer condenser, the electrolyte is not particularly limited; however, the cation in the electrolyte is preferably a quaternary ammonium ion because high ion conductivity and high electrochemical stability can be obtained. Preferred examples of such a quaternary ammonium ion-containing electrolyte are $NH_4AsF_6$, $NH_4BF_4$, $NH_4Br$, $NH_4CF_3SO_3$, $NH_4ClO_4$, $NH_4I$, $NH_4PF_6$, $NH_4SCN$, $ZnCl_2$, $(C_2H_5)_4NAsF_6$, $(C_2H_5)_4NBF_4$, $(C_2H_5)_4NBr$, $(C_2H_5)_4NCF_3SO_3$, $(C_2H_5)_4NClO_4$, $(C_2H_5)_4NI$, $(C_2H_5)_4NPF_6$, $(C_2H_5)_4NSCN$, $(C_4H_9)_4NAsF_6$, $(C_4H_9)_4NBF_4$, $(C_4H_9)_4NBr$, $(C_4H_9)_4NCF_3SO_3$, $(C_4H_9)_4NClO_4$, $(C_4H_9)_4NI$, $(C_4H_9)_4NPF_6$ and $(C_4H_9)_4NSCN$.

When the resulting polymer electrolyte gel is required to have higher ion conductivity, e.g., ion conductivity higher than $5.5 \times 10^{-3}$ S/cm at 20° C., the selection of an electrolyte with a small ion size is more preferred. Examples of such an electrolyte are those having $ClO_4^-$ rather than $CF_3SO_3^-$ as an anion or having $(C_2H_5)N^+$ rather than $(C_4H_9)_4N^+$ as a cation.

The concentration of an electrolyte used in the present invention is preferably adjusted to such a concentration that the electrolyte exhibits the highest ion conductivity in a solvent and that it does not precipitate from the solvent during use, particularly at low temperatures. For example, when the solvent used in the present invention is an organic solvent, the electrolyte is preferably adjusted to an concentration of from 0.5 mole/liter to 1.5 mole/liter, so as to exhibit the highest ion conductivity.

The solvent used in the present invention is not particularly limited, so long as it can dissolve both an acrylonitrile polymer and an electrolyte. Either a solvent may be used alone or a mixed solvent containing a plurality of solvents may be used. In other words, the solvent used in the present invention may also include those having poor solubility when used alone but exhibiting satisfactory solubility when used as a mixed solvent. Examples of the solvent used in the present invention are dimethylformamide, dimethylacetamide, dimethylsulfoxide, γ-butyrolactone, acetonitrile, succinonitrile, benzonitrile, nitromethane, N-methyl-2-pyrrolidone, ethylene carbonate, propylene carbonate, butylene carbonate, diethyl carbonate, dimethyl carbonate, ethyl methyl carbonate, sulfolane, methylsulfolane, 1,3-dioxane, 1,2-dimethoxyethane, 1,2-diethoxyethane, 1,3-dioxolane, 4,4-dimethyl-1,3-dioxolane, 4-methyl-1,3-dioxolane, tetrahydrofuran, 2-methyltetrahydrofuran and methyl acetate.

In the present invention, even if an acrylonitrile polymer can hardly dissolve only in a solvent, there can also be utilized any solvent that can dissolve the polymer when the above electrolyte is dissolved therein. Examples of such a solvent may include water. Examples of the electrolyte that can preferably dissolve in water and that can be utilized for such a purpose are LiBr, $ZnCl_2$, NaSCN, $NH_4SCN$, $HNO_3$ and $Al(ClO_4)_2$, and these electrolytes are usually used as a concentrated aqueous solution. If the concentration of an electrolyte is too high in the solution, the acrylonitrile polymer may be insoluble in the solution or the electrolyte may precipitate under the environment of use; therefore, when an aqueous solution is used as described above, the concentration of an electrolyte is adjusted near to the lower limit of concentration such that the solution can dissolve the polymer and can have a function enough to form a gel.

The solvent used in the present invention, when the electrolyte contains either cation of a lithium ion and a quaternary ammonium ion, may preferably be an organic solvent. Examples of the organic solvent preferably used are γ-butyrolactone, acetonitrile, ethylene carbonate, propylene carbonate, butylene carbonate, diethyl carbonate, dimethyl carbonate, ethyl methyl carbonate, sulfolane, methylsulfolane, 1,2-dimethoxyethane and 1,2-diethoxyethane. For practical use, the selection of an organic solvent that has low volatility, a boiling point over 80° C. and low viscosity, and that can easily dissolve both an acrylonitrile polymer and an electrolyte as described above, is more preferred for the improvement of safety and productivity. Examples of such a more preferred solvent are γ-butyrolactone and ethylene carbonate.

In general, if the concentration of an acrylonitrile polymer dissolved in a solvent is high as described above, there is a drawback that the concentration of an electrolyte to be dissolved will be decreased and the resulting polymer electrolyte gel will have decreased ion conductivity. This drawback may be solved by the use of a solvent having low solubility for the acrylonitrile polymer and high solubility for the electrolyte. In such a case, however, the resulting polymer electrolyte gel may easily cause phase separation between the solid components and the liquid components when exposed to a temperature of 50° C. or higher.

The thermostable polymer electrolyte gel of the present invention has an ion conductivity of $10^{-3}$ S/cm or higher, preferably from $2.5 \times 10^{-3}$ S/cm to 1 S/cm, at 20° C. and it exhibits the "retention of shape" in a thermostability test. The term "thermostability test" as used herein refers to a test in which the polymer electrolyte gel of the present invention is cut into a piece of 1 cm×2 cm×500 μm thick, which is attached by the adhesion force of the gel to the inner wall of a sample bottle at the position 1 cm above the bottom of the bottle, and the sample bottle is hermetically sealed and then placed in a thermostatic chamber at 80° C. for 2 days, after which the sample bottle is taken out and the change of shape on the gel is evaluated by visual observation. The term "retention of shape" as used herein means that the gel attached to the sample bottle exhibits no change of shape, no melt flowing or no phase separation observed between the acrylonitrile polymer and the electrolytic solution composed of an electrolyte and a solvent. In the above thermostability test, the conditions, at 80° C. for 2 days, are enough to determine whether the gel causes the change of shape under ordinary conditions or under sever conditions such as high temperatures.

When the thermostable polymer electrolyte gel of the present invention is used as an electrochemical device in the small-sized electronic instrument, it should particularly be made to have a small size and a light weight. In such a case, the thermostable polymer electrolyte gel of the present invention is in the shape of a thin film preferably having a thickness of from 1 μm to 500 μm, more preferably from 10 μm to 100 μm.

The following will describe a preferred example of the method for producing a thermostable polymer electrolyte gel of the present invention.

First, an acrylonitrile polymer and at least one electrolyte are dissolved in a solvent as described above to prepare a solution of the polymer.

In the preparation of this polymer solution, the acrylonitrile polymer is used in a shape having a large surface area (e.g., powder, flakes, fibers or porous particles) to facilitate the dissolution of the polymer in the solvent. The use of an acrylonitrile polymer in the shape of a fiber or a product formed from the fiber is particularly preferred. The term "product formed from [the] fiber" as used herein includes any product formed from a fiber of an acrylonitrile polymer, such as sheets, nonwoven fabrics, knitted fabrics and woven fabrics. When the acrylonitrile polymer is used in the shape of a fiber, the fineness and length of the fiber are not particularly limited, but can be suitably selected as required. The method for producing a fiber made of an acrylonitrile polymer or a product formed from the fiber is well known in the art.

In general, polymer electrolyte gels are required to have a smaller thickness in order to allow the production of lightweight, small-sized electrochemical devices and to obtain satisfactory flexibility. The acrylonitrile polymer used in the present invention has a molecular weight of several tens of thousands or higher, so that it has high viscosity when dissolved in a solvent; the thermostable polymer electrolyte gel of the present invention may, therefore, have neither uniform nor satisfactory small thickness, even if an ordinary coating method is used.

When the acrylonitrile polymer is used in the shape of a fiber or a product formed from the fiber, the polymer solution can be prepared by adding an electrolytic solution that has previously been prepared from the solvent and at least one electrolyte as described above, to the acrylonitrile polymer fiber disposed, for example, on a substrate (containing an electrode or a support) or a frame for use in the production of an electrochemical device. These procedures can shorten the time to be taken from the preparation of the polymer solution to the production of the thermostable polymer electrolyte gel of the present invention without particular stirring in the preparation of the polymer solution. The thermostable polymer electrolyte gel thus produced has a uniform and satisfactory small thickness. It is also found that the thermostable polymer electrolyte gel produced in this process has further improved strength. The reason for this is believed that the orientation of the acrylonitrile polymer in the fiber formation also effectively acts in the gel formation and makes a contribution to the improvement of gel strength.

In the present invention, the prepared polymer solution itself can be disposed in the shape of a thin film on the substrate or the frame. The method for disposing a polymer solution may be a coating method such as roller coating using applicator rolls or other means; bar coater coating, screen coating, spin coating or doctor blade coating. In any of these coating methods, an important factor is the viscosity of a polymer solution. The coating may, therefore, be effected by controlling the viscosity of a polymer solution in the range of temperature at which the acrylonitrile polymer hardly degrades. Thus, the polymer solution can be disposed to have any thickness and shape on the substrate or the frame.

The polymer solution is then cooled to a temperature of 0° C. or lower. The cooling temperature set to 0° C. or lower allows the rapid formation of acrylonitrile polymer microcrystals in the polymer solution and facilitates the gelation. If the cooling temperature is higher than 0° C., the formation of acrylonitrile polymer microcrystals will be retarded; therefore, high cooling temperatures are not suitable for the production on an industrial scale. Even if the cooling can be effected at a temperature higher than 0° C. to produce a polymer electrolyte gel in a short time, the resulting gel has unsatisfactory strength and elasticity. In the present invention, for the purpose of producing a thermostable polymer electrolyte gel having more satisfactory strength and elasticity, the polymer solution is preferably cooled to around 0° C. and kept for a prescribed time, followed by cooling to lower temperatures (e.g., −20° C.).

The cooling time is preferably selected in the range of from 0.5 to 6 hours so that acrylonitrile polymer microcrystals can be formed effectively and in as large quantities as possible.

Thus, in the present invention, the strength and elasticity of the thermostable polymer electrolyte gel produced can be controlled by adjusting the cooling temperature and time. In general, when the production of a polymer electrolyte gel is achieved by cooling, the polymer solution may cause phase separation between the solid components and the liquid components. In the present invention, however, there occurs no such phase separation.

Before and/or after the cooling step, of course, some part of the solvent in the polymer solution may be evaporated or volatilized. The evaporation or volatilization may be effected, for example, by means of adjusting the viscosity of the polymer solution or by means of facilitating the gelation; however, these means are not necessarily effective from the purposes of improving ion conductivity as well as of providing a safe production process with avoidance of air pollution.

The thermostable polymer electrolyte gel of the present invention is produced in this manner. The resulting thermostable polymer electrolyte gel can be further stretched with rollers or other means, and formed into a desired shape.

The reason why the thermostable polymer electrolyte gel of the present invention has high ion conductivity and retain the shape without melting even at high temperatures (e.g., 80° C.) and without causing phase separation between the solid components and the liquid components has not been fully elucidated, but it is believed as follows:

The acrylonitrile polymer used in the present invention is moderately soluble and moderately insoluble in a solvent. The use of such an acrylonitrile polymer allows lower concentrations of the polymer dissolved in a solvent than in the conventional cases and dissolution of enough electrolytes in the solvent. This results in a polymer electrolyte gel having higher ion conductivity than that of any conventional gel. In addition, the acrylonitrile polymer used in the present invention has high affinity for solvents, so that the thermostable polymer electrolyte gel of the present invention, even if exposed to high temperatures and/or stored for a long period of time, causes no phase separation between the solid components and the liquid components and therefore retains the shape of a gel stably within a wide range of temperature.

Furthermore, the reason why the thermostable polymer electrolyte gel of the present invention has both suitable viscoelasticity enough for adhesion to electrodes and strength enough to withstand formative working and can be provided advantageously and safely on an industrial scale is believed as follows:

In the thermostable polymer electrolyte gel of the present invention, the liquid components contained in large quantities can have an effective function for adhesion to electrodes. In addition, the acrylonitrile polymer used in the present invention is a flexible gel product, so that the polymer molecules appear to have a stereostructure in which they are intertwining, as if crosslinked, with each other in the thermostable polymer electrolyte gel. Therefore, the thermostable polymer electrolyte gel of the present invention can have improved viscoelasticity and can follow the environmental change of electrodes attached thereto.

The reasons why thermostable polymer electrolyte gels can be produced in an industrially advantageous and safe manner by the production process of the present invention are as follows. In the present invention, there is no need to evaporate any volatile solvent for gelation, so that no consideration is required toward the air pollution or influence on the human body by the vaporized solvent. In addition, effective gelation can be achieved only by cooling a polymer solution to a temperature of 0° C. or lower, so that various means of working (e.g., frame working, coating, spray cooling for the production of powdered gels, and capsulation for the production of flaky gels) can be used. Furthermore, the solvent evaporation and concentration change of an acrylonitrile polymer hardly occur, so that thermostable polymer electrolyte gels can be stably produced. In contrast, when the rate of gel formation is to be increased by the conventional casting method, gels have been formed only into specific shapes (e.g., thin films with a large surface area) to increase the efficiency of solvent evaporation. For the evaporation of any solvent by the conventional casting method are required particular equipment and time.

In the present invention, when the acrylonitrile polymer is particularly used in the shape of a fiber or a product formed from the fiber, it can rapidly be dissolved in an electrolytic solution containing an electrolyte in a solvent because of its large specific surface area. For this reason, only by disposing the fiber made of this polymer or the product formed from the fiber on a substrate or a frame and then adding the electrolytic solution to the surface thereof, a polymer solution can easily be prepared without particular stirring and thermostable polymer electrolyte gels can be produced for a shorter time.

The thermostable polymer electrolyte gel of the present invention has high ion conductivity and thermostability both enough to withstand practical use, and further has suitable viscoelasticity enough for adhesion to electrodes and strength enough to withstand formative working. The thermostable polymer electrolyte of the present invention having such characteristics are useful as the material for electrochemical devices such as thin-shaped electric batteries, electrochromic displays, electric double layer condensers and various sensors.

EXAMPLES

The present invention will be further illustrated by the following examples; it is, however, not limited to these examples. The polymer electrolyte gels obtained in these examples are evaluated by the methods as explained below.

Ion conductivity

The resulting polymer electrolyte gel was cut into a round plate having a diameter of 2 cm and an uniform thickness of about 500 µm, which was then interposed between two round platinum electrodes each having a diameter of 1.5 cm. An alternating current impedance analyzer was connected to the platinum electrodes, and ion conductivity was measured in S/cm at 20° C. When a lithium salt was used as an electrolyte, the production and evaluation of the above polymer electrolyte gel were carried out under an atmosphere of dry argon gas having a dew point of −40° C.

Thermostability test

The resulting polymer electrolyte gel was cut into a piece of 1 cm×2 cm×500 µm thick, which was then attached by the adhesion force of the gel to the inner wall of a sample bottle at the position 1 cm above the bottom. The sample bottle was then hermetically sealed and placed in a thermostatic chamber at 80° C. for 2 days, after which the sample bottle was taken out and the change of shape on the gel was evaluated by visual observation. The results of evaluation were rated as follows:

"Retention of shape" . . . no change of shape;

"Separation" . . . no melt flowing of the gel in the sample bottle, but phase separation observed between solid components and liquid components; and "Melting" . . . melt flowing of the gel toward the bottom of the sample bottle.

Strength/elasticity test

A polymer electrolyte gel having a thickness of 50 µm was formed on a support (smooth flat plate made of SUS304), and the gel was evaluated for the state when peeled off as follows:

◯ . . . having strength enough for complete peeling and elasticity for returning to the original shape, and further having strength enough to withstand formative working;

Δ . . . having strength enough for complete peeling, but causing gel stretching because of poor elasticity; and X . . . fragile, or not completely peeled off because of too high viscosity.

Example 1

Using a mixed solvent containing ethylene carbonate and propylene carbonate in a molar ratio of 1:1, an electrolytic solution containing 1.2 mole/liter $LiBF_4$ was prepared. To this electrolytic solution, a dry powder of an acrylonitrile polymer (weight average molecular weight, Mw: 150,000) made of 4 wt % methyl acrylate and 96 wt % acrylonitrile was added in a proportion of 7.8 wt %. The polymer was dispersed in the solvent by stirring, and the temperature was gradually increased to about 120° C., at which the polymer dissolved in the solvent to give a polymer solution. The preparation of this polymer solution was carried out under the conditions that the solvent hardly volatilized.

The polymer solution was spread over the surface of a support (smooth flat plate made of SUS304) with a 50 µm or 500 µm spacer disposed thereon. The support was covered with a Teflon® sheet and placed in a freezer at −20° C. for 4 hours to give a polymer electrolyte gel. All the steps ranging from the preparation of the mixed solvent to the production of the polymer electrolyte gel were conducted under an atmosphere of dry argon gas. The results of evaluation for the polymer electrolyte gel are shown in Table 1.

Example 2

A polymer electrolyte gel was produced in the same manner as described in Example 1, except that a polymer solution was prepared by the addition of a 7.0 wt % dry powder of an acrylonitrile polymer (Mw: 440,000) made of 3 wt % methyl acrylate and 97 wt % acrylonitrile, which was substituted for the acrylonitrile polymer of Example 1. The results of evaluation for the polymer electrolyte gel are shown in Table 1.

Example 3

A polymer electrolyte gel was produced in the same manner as described in Example 1, except that $LiBF_4$ was replaced with $LiClO_4$ and a polymer solution was prepared by the addition of a 6.9 wt % dry powder of an acrylonitrile polymer (Mw: 470,000) made of 3 wt % vinyl acetate and 97 wt % acrylonitrile, which was substituted for the acrylonitrile polymer of Example 1. The results of evaluation for the polymer electrolyte gel are shown in Table 1.

Example 4

A polymer electrolyte gel was produced in the same manner as described in Example 1, except that $LiBF_4$ was replaced with $LiClO_4$ and a polymer solution was prepared by the addition of a 8.9 wt % dry powder of an acrylonitrile polymer (Mw: 560,000) made of 10 wt % methyl methacrylate and 90 wt % acrylonitrile, which was substituted for the acrylonitrile polymer of Example 1. The results of evaluation for the polymer electrolyte gel are shown in Table 1.

Comparative Example 1

A polymer electrolyte gel was produced in the same manner as described in Example 1, except that a polymer solution was prepared by the addition of a 2.8 wt % dry powder of an acrylonitrile polymer (Mw: 240,000) made of 100 wt % acrylonitrile, which was substituted for the acrylonitrile polymer of Example 1. The results of evaluation for the polymer electrolyte gel are shown in Table 1.

Comparative Example 2

A polymer electrolyte gel was produced in the same manner as described in Example 1, except that a polymer solution was prepared by the addition of a 9.0 wt % dry powder of an acrylonitrile polymer (Mw: 100,000) made of 10 wt % methyl acrylate and 90 wt % acrylonitrile, which was substituted for the acrylonitrile polymer of Example 1. The results of evaluation for the polymer electrolyte gel are shown in Table 1.

Comparative Example 3

A polymer electrolyte gel was produced in the same manner as described in Example 1, except that $LiBF_4$ was replaced with $LiClO_4$ and a polymer solution was prepared by the addition of a 2.7 wt % dry powder of an acrylonitrile polymer (Mw: 760,000) made of 3 wt % vinyl acetate and 97 wt % acrylonitrile, which was substituted for the acrylonitrile polymer of Example 1. The results of evaluation for the polymer electrolyte gel are shown in Table 1.

TABLE 1

| | Acrylonitrile polymer | | | | | | | |
|---|---|---|---|---|---|---|---|---|
| | CoMo[1] | AN content[2] (wt %) | Mw | P conc.[3] (wt %) | Electrolyte | Ion conductivity (S/cm) | Thermo-stability test | Strength/-elasticity test |
| Example 1 | methyl acrylate | 96 | 150,000 | 7.8 | $LiBF_4$ | $2.6 \times 10^{-3}$ | retention of shape | ○ |
| Example 2 | methyl acrylate | 97 | 440,000 | 7.0 | $LiBF_4$ | $3.2 \times 10^{-3}$ | retention of shape | ○ |
| Example 3 | vinyl acetate | 97 | 470,000 | 6.9 | $LiClO_4$ | $4.5 \times 10^{-3}$ | retention of shape | ○ |
| Example 4 | methyl methacrylate | 90 | 560,000 | 8.9 | $LiClO_4$ | $2.5 \times 10^{-3}$ | retention of shape | ○ |
| Comparative Example 1 | — | 100 | 240,000 | 2.8 | $LiBF_4$ | —[4] | separation | X |
| Comparative Example 2 | methyl acrylate | 90 | 100,000 | 9.0 | $LiBF_4$ | $2.5 \times 10^{-3}$ | melting | Δ |
| Comparative Example 3 | vinyl acetate | 97 | 760,000 | 2.7 | $LiClO_4$ | — | separation | X |

[1]Copolymerizable monomers contained in the acrylonitrile polymer.
[2]Acrylonitrile content in the acrylonitrile polymer.
[3]Acrylonitrile polymer content in the resulting polymer electrolyte gel.
[4]Not tested.

As can be seen from Table 1, the polymer electrolyte gels of Examples 1 to 4 exhibited the "retention of shape" as the result of the thermostability test and had a high ion conductivity of not lower than $2.5 \times 10^{-3}$ S/cm at 20° C. The polymer electrolyte gels of Examples 1 to 4 further exhibited good results in the strength/elasticity test and it is, therefore, found that they can fully withstand formative working.

In contrast, the acrylonitrile polymer of Comparative Example 1 dissolved in the electrolytic solution only in a small amount at 120° C. The polymer electrolytic gel produced with such an acrylonitrile polymer became fragile and caused the separation of liquid components at ordinary temperature, thereby making impossible the measurement of ion conductivity. The acrylonitrile polymer of Comparative E Example 2 had excellent solubility in the electrolytic solution; however, the resulting polymer electrolyte gel melted at 80° C., which was not enough to withstand practical use. Furthermore, the acrylonitrile polymer of Comparative Example 3 dissolved in the electrolytic solution only in a small amount at 120° C. The polymer electrolyte gel produced with such an acrylonitrile polymer became fragile and caused the separation of liquid components at ordinary temperature, thereby making impossible the measurement of ion conductivity.

In addition, temperatures were examined at which the acrylonitrile polymers of Comparative Examples 1 and 3 dissolved in a proportion of about 7 wt % in the respective electrolyte solutions of these comparative examples, and both were found to be higher than 140° C. The polymer solutions obtained at this time exhibited significant coloring.

Example 5

Using the same mixed solvent as used in Example 1, an electrolytic solution containing 1.2 mole/liter $LiBF_4$ was prepared. To this electrolytic solution, a dry powder of an acrylonitrile polymer (weight average molecular weight, Mw: 70,000) made of 3 wt % methyl acrylate and 97 wt % acrylonitrile was added in a proportion of 8.0 wt %. The polymer was dispersed in the solvent by stirring, and the temperature was gradually increased to about 120° C., at which the polymer dissolved in the solvent to give a polymer solution. The preparation of this polymer solution was carried out under the conditions that the solvent hardly volatilized.

Using this polymer solution, a polymer electrolyte gel was produced in the same manner as described in Example 1. The results of evaluation for the polymer electrolyte gel are shown in Table 2.

Example 6

A polymer electrolyte gel was produced in the same manner as described in Example 5, except that the acrylonitrile polymer of Example 5 was replaced with an acrylonitrile polymer (Mw: 120,000) made of 3 wt % methyl acrylate and 97 wt % acrylonitrile. The results of evaluation for the polymer electrolyte gel are shown in Table 2.

Example 7

A polymer electrolyte gel was produced in the same manner as described in Example 5, except that the acrylonitrile polymer of Example 5 was replaced with an acrylonitrile polymer (Mw: 520,000) made of 3 wt % methyl acrylate and 97 wt % acrylonitrile. The results of evaluation for the polymer electrolyte gel are shown in Table 2.

Comparative Example 4

A polymer electrolyte gel was produced in the same manner as described in Example 5, except that the acrylonitrile polymer of Example 5 was replaced with an acrylonitrile polymer (Mw: 60,000) made of 3 wt % methyl acrylate and 97 wt % acrylonitrile. The results of evaluation for the polymer electrolyte gel are shown in Table 2.

Comparative Example 5

A polymer electrolyte gel was produced in the same manner as described in Example 5, except that the acrylonitrile polymer of Example 5 was replaced with an acrylonitrile polymer (Mw: 550,000) made of 3 wt % methyl acrylate and 97 wt % acrylonitrile. The results of evaluation for the polymer electrolyte gel are shown in Table 2.

TABLE 2

| | Mw of acrylonitrile polymer | Ion conductivity (S/cm) | Thermo-stability test | Strength/-elasticity test |
|---|---|---|---|---|
| Example 5 | 70,000 | $2.8 \times 10^{-3}$ | retention of shape | ○ |
| Example 6 | 120,000 | $2.7 \times 10^{-3}$ | retention of shape | ○ |
| Example 7 | 520,000 | $2.5 \times 10^{-3}$ | retention of shape | ○ |
| Comparative Example 4 | 60,000 | $2.0 \times 10^{-3}$ | melting | Δ |
| Comparative Example 5 | 550,000 | —[1] | — | — |

[1]Not tested.

As can be seen from Table 2, the polymer electrolyte gels of Examples 5 to 7 exhibited the "retention of shape" as the result of the thermostability test and had a high ion conductivity of not lower than $5 \times 10^{-3}$ S/cm at 20° C. The polymer electrolyte gels of Examples 5 to 7 further exhibited good results in the strength/elasticity test and it is, therefore, found that they can fully withstand formative working.

In contrast, the polymer electrolyte gel of Comparative Example 4 had low elasticity, so that the gel stretched when peeled off in the strength/elasticity test but did not returned to the original state, and the polymer electrolyte gel further had no thermostability, so that the gel was not able to withstand actual use. The acrylonitrile polymer of Comparative Example 5 had low solubility in the electrolytic solution, so that heating at a temperature of 145° C. or higher for a long time was required for the preparation of a polymer solution. In addition, this polymer solution exhibited coloring into dark blown that was probably caused by the degradation of the acrylonitrile polymer. It was difficult to form the resulting polymer electrolyte gel into a film having a uniform thickness.

Example 8

Using the same mixed solvent as used in Example 1, an electrolytic solution containing 1.2 mole/liter $LiBF_4$ was prepared. To this electrolytic solution, a dry powder of an acrylonitrile polymer (weight average molecular weight, Mw: 250,000) made of 2 wt % methyl acrylate and 98 wt % acrylonitrile was added in a proportion of 8.0 wt %. The polymer was dispersed in the solvent by stirring, and the temperature was gradually increased to about 120° C., at which the polymer dissolved in the solvent to give a polymer solution. The preparation of this polymer solution was carried out under the conditions that the solvent hardly volatilized.

Using this polymer solution, a polymer electrolyte gel was produced in the same manner as described in Example 1. The results of evaluation for the polymer electrolyte gel are shown in Table 3.

Example 9

A polymer electrolyte gel was produced in the same manner as described in Example 8, except that the acrylonitrile polymer of Example 8 was replaced with an acrylonitrile polymer (Mw: 250,000) made of 6 wt % methyl acrylate and 94 wt % acrylonitrile. The results of evaluation for the polymer electrolyte gel are shown in Table 3.

Example 10

A polymer electrolyte gel was produced in the same manner as described in Example 8, except that the acrylonitrile polymer of Example 8 was replaced with an acrylonitrile polymer (Mw: 250,000) made of 11 wt % methyl acrylate and 89 wt % acrylonitrile. The results of evaluation for the polymer electrolyte gel are shown in Table 3.

Comparative Example 6

A polymer electrolyte gel was produced in the same manner as described in Example 8, except that the acrylonitrile polymer of Example 8 was replaced with an acrylonitrile polymer (Mw: 250,000) made of 1 wt % methyl acrylate and 99 wt % acrylonitrile. The results of evaluation for the polymer electrolyte gel are shown in Table 3.

Comparative Example 7

A polymer electrolyte gel was produced in the same manner as described in Example 8, except that the acrylonitrile polymer of Example 8 was replaced with an acrylonitrile polymer (Mw: 250,000) made of 12 wt % methyl acrylate and 88 wt % acrylonitrile. The results of evaluation for the polymer electrolyte gel are shown in Table 3.

TABLE 3

| | AN content[1] (wt %) | Ion conductivity (S/cm) | Thermo-stability test | Strength/-elasticity test |
|---|---|---|---|---|
| Example 8 | 98 | $2.5 \times 10^{-3}$ | retention of shape | ○ |
| Example 9 | 94 | $2.7 \times 10^{-3}$ | retention of shape | ○ |
| Example 10 | 89 | $2.8 \times 10^{-3}$ | retention of shape | ○ |
| Comparative Example 6 | 99 | —[2] | — | — |
| Comparative Example 7 | 88 | $2.8 \times 10^{-3}$ | melting | Δ |

[1]Acrylonitrile content in the acrylonitrile polymer.
[2]Not tested.

As can be seen from Table 3, the polymer electrolyte gels of Examples 8 to 10 exhibited the "retention of shape" as the result of the thermostability test and had a high ion conductivity of not lower than $2.5 \times 10^{-3}$ S/cm at 20° C. The polymer electrolyte gels of Examples 8 to 10 further exhibited good results in the strength/elasticity test and it is, therefore, found that they can fully withstand formative working.

In contrast, the polymer electrolyte gel of Comparative Example 6 had low solubility in the electrolytic solution, so that heating at a temperature of 145° C. or higher for a long time was required for the preparation of a polymer solution. In addition, this polymer solution exhibited coloring into dark blown that was probably caused by the degradation of the acrylonitrile polymer. It was difficult to form the resulting polymer electrolyte gel into a film having a uniform thickness. The polymer electrolyte gel of Comparative Example 7 had low elasticity, so that the gel stretched when peeled off in the strength/elasticity test but did not returned to the original state, and the polymer electrolyte gel further had no thermostability at 80° C., so that the gel was not able to withstand actual use.

Example 11

Using the same mixed solvent as used in Example 1, an electrolytic solution containing 1.2 mole/liter $LiBF_4$ was prepared. To this electrolytic solution, a dry powder of an acrylonitrile polymer (weight average molecular weight, Mw: 200,000) made of 3 wt % methyl acrylate and 97 wt % acrylonitrile was added in a proportion of 3.0 wt %. The polymer was dispersed in the solvent by stirring, and the temperature was gradually increased to about 120° C., at which the polymer dissolved in the solvent to give a polymer solution. The preparation of this polymer solution was carried out under the conditions that the solvent hardly volatilized.

Using this polymer solution, a polymer electrolyte gel was produced in the same manner as described in Example 1. The results of evaluation for the polymer electrolyte gel are shown in Table 4.

Example 12

A polymer electrolyte gel was produced in the same manner as described in Example 11, except that a dry powder of the acrylonitrile polymer of Example 11 was used in a proportion of 8.0 wt %. The results of evaluation for the polymer electrolyte gel are shown in Table 4.

Example 13

A polymer electrolyte gel was produced in the same manner as described in Example 11, except that a dry powder of the acrylonitrile polymer of Example 11 was used in a proportion of 9.0 wt %. The results of evaluation for the polymer electrolyte gel are shown in Table 4.

Comparative Example 8

A polymer electrolyte gel was produced in the same manner as described in Example 11, except that a dry powder of the acrylonitrile polymer of Example 11 was used in a proportion of 2.4 wt %. The results of evaluation for the polymer electrolyte gel are shown in Table 4.

Comparative Example 9

A polymer electrolyte gel was produced in the same manner as described in Example 11, except that a dry powder of the acrylonitrile polymer of Example 11 was used in a proportion of 9.5 wt %. The results of evaluation for the polymer electrolyte gel 10 are shown in Table 4.

TABLE 4

| | P conc.[1] (wt %) | Ion conductivity (S/cm) | Thermo- stability test | Strength/- elasticity test |
|---|---|---|---|---|
| Example 11 | 3.0 | $4.6 \times 10^{-3}$ | retention of shape | ○ |
| Example 12 | 8.0 | $2.6 \times 10^{-3}$ | retention of shape | ○ |
| Example 13 | 9.0 | $2.5 \times 10^{-3}$ | retention of shape | ○ |
| Comparative Example 8 | 2.5 | $4.6 \times 10^{-3}$ | separation | Δ |
| Comparative Example 9 | 9.5 | —[2] | — | — |

[1]Acrylonitrile polymer content in the resulting polymer electrolyte gel.
[2]Not tested.

As can be seen from Table 4, the polymer electrolyte gels of Examples 11 to 13 exhibited the "retention of shape" as the result of the thermostability test and had a high ion conductivity of not lower than $2.5 \times 10^{-3}$ S/cm at 20° C. The polymer electrolyte gels of Examples 11 to 13 further exhibited good results in the strength/elasticity test and it is, therefore, found that they can fully withstand formative working.

In contrast, the polymer electrolyte gel of Comparative Example 8 had high ion conductivity but exhibited the "separation" as the result of the thermostability test and had slightly poor elasticity, so that the gel was not able to withstand actual use. The acrylonitrile polymer of Comparative Example 9 required that the temperature higher than 140° C. was kept for a long time to ensure complete dissolution, and this polymer solution exhibited coloring into dark blown that was probably caused by the degradation of the acrylonitrile polymer. In addition, it was difficult to spread the resulting polymer solution to have a uniform thickness, which will become a problem on practical use.

Example 14

Using the same mixed solvent as used in Example 1, an electrolytic solution containing 1.2 mole/liter $LiBF_4$ was prepared. To this electrolytic solution, a dry powder of an acrylonitrile polymer (weight average molecular weight, Mw: 120,000) made of 3 wt % vinyl acetate and 97 wt % acrylonitrile was added in a proportion of 8.0 wt %. The polymer was dispersed in the solvent by stirring, and the temperature was gradually increased to about 120° C., at which the polymer dissolved in the solvent to give a polymer solution. The preparation of this polymer solution was carried out under the conditions that the solvent hardly volatilized.

The polymer solution was spread over the surface of a support (smooth flat plate made of SUS304) with a 50 μm or 500 μm spacer disposed thereon. The support was covered with a Teflon® sheet and placed in a freezer at 0° C. for 1 hour to give a polymer electrolyte gel. All the steps ranging from the preparation of the mixed solvent to the production of the polymer electrolyte gel were conducted under an atmosphere of dry argon gas. The results of evaluation for the polymer electrolyte gel are shown in Table 5.

Example 15

A polymer electrolyte gel was produced in the same manner as described in Example 14, except that the spread polymer solution was placed in a freezer at −10° C. for 1 hour. The results of evaluation for the polymer electrolyte gel are shown in Table 5.

Comparative Example 10

A polymer electrolyte gel was produced in the same manner as described in Example 14, except that the spread polymer solution was placed at 3° C. for 1 hour. The results of evaluation for the polymer electrolyte gel are shown in Table 5.

Comparative Example 11

A polymer electrolyte gel was produced in the same manner as described in Example 14, except that the spread polymer solution was placed at 5° C. for 1 hour. The results of evaluation for the polymer electrolyte gel are shown in Table 5.

Comparative Example 12

The same procedures as described in Example 14 were followed, except that the spread polymer solution was placed at 10° C. for 1 hour; however, no gelation was observed and it was impossible to produce any polymer electrolyte gel.

TABLE 5

| | Cooling temperature (° C.) | Ion conductivity (S/cm) | Thermo-stability test | Strength/-elasticity test |
|---|---|---|---|---|
| Example 14 | 0 | $2.8 \times 10^{-3}$ | retention of shape | ○ |
| Example 15 | −10 | $2.8 \times 10^{-3}$ | retention of shape | ○ |
| Comparative Example 10 | 3 | $2.9 \times 10^{-3}$ | separation | Δ |
| Comparative Example 11 | 5 | $2.9 \times 10^{-3}$ | separation | × |
| Comparative Example 12 | 10 | no gelation | —[1] | — |

[1]Not tested.

As can be seen from Table 5, the polymer electrolyte gels of Examples 14 and 15 exhibited the "retention of shape" as the result of the thermostability test and had a high ion conductivity of not lower than $2.5 \times 10^{-3}$ S/cm at 20° C. The polymer electrolyte gels of Examples 14 and 15 further exhibited good results in the strength/elasticity test and it is, therefore, found that they can fully withstand formative working.

In contrast, the polymer electrolyte gel of Comparative Example 10 had high ion conductivity but poor elasticity and thermostability. The polymer electrolyte gel of Comparative Example 11 became fragile and caused the separation of liquid components at 80° C. No gelation was effected at the cooling temperature used in Comparative Example 12 and it is, therefore, found that such a temperature is not suitable for the production of a polymer electrolyte gel.

Example 16

Using a mixed solvent containing propylene carbonate and dimethoxyethane in a molar ratio of 9:1, an electrolytic solution containing 1.0 mole/liter ammonium tetraethylborofluoride $((C_2H_5)_4NBF_4$, hereinafter referred to as $TEABF_4)$ was prepared. To this electrolytic solution, a dry powder of an acrylonitrile polymer (weight average molecular weight, Mw: 150,000) made of 4 wt % methyl acrylate and 96 wt % acrylonitrile was added in a proportion of 7.8 wt %. The polymer was dispersed in the solvent by stirring, and the temperature was gradually increased to about 120° C., at which the polymer dissolved in the solvent to give a polymer solution. The preparation of this polymer solution was carried out in a closed system that the solvent hardly volatilized.

Using this polymer solution, a polymer electrolyte gel was produced in the same manner as described in Example 1. The results of evaluation for the polymer electrolyte gel are shown in Table 6.

Example 17

A polymer electrolyte gel was produced in the same manner as described in Example 16, except that a polymer solution was prepared by the addition of a 7.0 wt % dry powder of an acrylonitrile polymer (Mw: 440,000) made of 3 wt % methyl acrylate and 97 wt % acrylonitrile, which was substituted for the acrylonitrile polymer of Example 16. The results of evaluation for the polymer electrolyte gel are shown in Table 6.

Example 18

A polymer electrolyte gel was produced in the same manner as described in Example 1, except that $TEABF_4$ was replaced with ammonium tetrabutylborofluoride $((C_4H_9)_4NBF_4$, hereinafter referred to as $TBABF_4)$ and a polymer solution was prepared by the addition of a 6.9 wt % dry powder of an acrylonitrile polymer (Mw: 470,000) made of 3 wt % vinyl acetate and 97 wt % acrylonitrile, which was substituted for the acrylonitrile polymer of Example 16. The results of evaluation for the polymer electrolyte gel are shown in Table 6.

Example 19

A polymer electrolyte gel was produced in the same manner as described in Example 16, except that $TEABF_4$ was replaced with $TBABF_4$ and a polymer solution was prepared by the addition of a 8.9 wt % dry powder of an acrylonitrile polymer (Mw: 560,000) made of 10 wt % methyl methacrylate and 90 wt % acrylonitrile, which was substituted for the acrylonitrile polymer of Example 16. The results of evaluation for the polymer electrolyte gel are shown in Table 6.

Comparative Example 13

A polymer electrolyte gel was produced in the same manner as described in Example 16, except that a polymer solution was prepared by the addition of a 2.7 wt % dry powder of an acrylonitrile polymer (Mw: 240,000) made of 100 wt % acrylonitrile, which was substituted for the acrylonitrile polymer of Example 16. The results of evaluation for the polymer electrolyte gel are shown in Table 6.

Comparative Example 14

A polymer electrolyte gel was produced in the same manner as described in Example 16, except that a polymer solution was prepared by the addition of a 9.0 wt % dry powder of an acrylonitrile polymer (Mw: 100,000) made of 10 wt % methyl acrylate and 90 wt % acrylonitrile, which was substituted for the acrylonitrile polymer of Example 16. The results of evaluation for the polymer electrolyte gel are shown in Table 6.

Comparative Example 15

A polymer electrolyte gel was produced in the same manner as described in Example 16, except that a polymer solution was prepared by the addition of a 2.6 wt % dry powder of an acrylonitrile polymer (Mw: 790,000) made of 3 wt % methyl acrylate and 97 wt % acrylonitrile, which was substituted for the acrylonitrile polymer of Example 16. The results of evaluation for the polymer electrolyte gel are shown in Table 6.

TABLE 6

| | Acrylonitrile polymer | | | | | | | |
|---|---|---|---|---|---|---|---|---|
| | CoMo[1] | AN content[2] (wt %) | Mw | P conc.[3] (wt %) | Electrolyte | Ion conductivity (S/cm) | Thermo-stability test | Strength/-elasticity test |
| Example 16 | methyl acrylate | 96 | 150,000 | 7.8 | TEABF$_4$ | $5.4 \times 10^{-3}$ | retention of shape | ◯ |
| Example 17 | methyl acrylate | 97 | 440,000 | 7.0 | TEABF$_4$ | $5.8 \times 10^{-3}$ | retention of shape | ◯ |
| Example 18 | vinyl acetate | 97 | 470,000 | 6.9 | TBABF$_4$ | $6.2 \times 10^{-3}$ | retention of shape | ◯ |
| Example 19 | methyl methacrylate | 90 | 560,000 | 8.9 | TBABF$_4$ | $5.1 \times 10^{-3}$ | retention of shape | ◯ |
| Comparative Example 13 | — | 100 | 240,000 | 2.7 | TEABF$_4$ | —[4] | separation | X |
| Comparative Example 14 | methyl acrylate | 90 | 100,000 | 9.0 | TEABF$_4$ | $2.8 \times 10^{-3}$ | melting | Δ |
| Comparative Example 15 | methyl acrylate | 97 | 790,000 | 2.6 | TEABF$_4$ | — | separation | X |

[1]Copolymerizable monomers contained in the acrylonitrile polymer.
[2]Acrylonitrile content in the acrylonitrile polymer.
[3]Acrylonitrile polymer content in the resulting polymer electrolyte gel.
[4]Not tested.

As can be seen from Table 6, the polymer electrolyte gels of Examples 16 to 19 exhibited the "retention of shape" as the result of the thermostability test and had a high ion conductivity of not lower than $5.1 \times 10^{-3}$ S/cm at 20° C. The polymer electrolyte gels of Examples 16 to 19 further exhibited good results in the strength/elasticity test and it is, therefore, found that they can fully withstand formative working.

In contrast, the acrylonitrile polymer of Comparative Example 13 dissolved in the electrolytic solution only in a small amount at 120° C. The polymer electrolytic gel produced with such an acrylonitrile polymer became fragile and caused the separation of liquid components when the temperature returned from −20° C. to ordinary temperature, so that the gel was not able to retain the shape to a full extent, thereby making impossible the measurement of ion conductivity. The acrylonitrile polymer of Comparative Example 14 had high solubility in the electrolytic solution; however, the resulting polymer electrolyte gel melted at 80° C., which was not able to withstand practical use. Furthermore, the acrylonitrile polymer of Comparative Example 15 dissolved in the electrolytic solution only in a small amount at 120° C. The polymer electrolyte gel produced with such an acrylonitrile polymer became fragile and caused the separation of liquid components at ordinary temperature, so that the gel was not able to retain the shape to a full extent, thereby making impossible the measurement of ion conductivity.

In addition, temperatures were examined at which the acrylonitrile polymers of Comparative Examples 13 and 15 dissolved in a proportion of about 7 wt % in the respective electrolyte solutions of these comparative examples, and both were found to be higher than 140° C. The polymer solutions obtained at this time exhibited significant coloring.

Example 20

Using a mixed solvent containing propylene carbonate and dimethoxyethane in a molar ratio of 9:1, an electrolytic solution containing 1.0 mole/liter TEABF$_4$ was prepared. To this electrolytic solution, a dry powder of an acrylonitrile polymer (Mw: 150,000) made of 4 wt % methyl acrylate and 96 wt % acrylonitrile was added in a proportion of 7.0 wt %. The polymer was dispersed in the solvent by stirring, and the temperature was gradually increased to about 115° C., at which the polymer dissolved in the solvent to give a polymer solution.

This polymer solution in a volume of 30 ml was poured into a cylindrical test tube having an inner diameter of 2 cm and a length of 18 cm. The test tube was closely stoppered and placed in a freezer at −20° C. for 4 hours to give a polymer electrolyte gel. The resulting polymer electrolyte gel was uniformly transparent all over the whole.

The polymer electrolyte gel was taken out from the test tube and cut into a round plate having a diameter of 2 cm and a uniform thickness of about 500 μm, which was subjected to the measurement of ion conductivity. The polymer electrolyte gel had an ion conductivity of $5.0 \times 10^{-3}$ S/cm. The polymer electrolyte gel exhibited the "retention of shape" as the result of the thermostability test. This means that the thermostable polymer electrolyte gel of the present invention can easily be produced even in a flame such as a test tube.

Comparative Example 16

A polymer solution was prepared in the same manner as described in Example 20. The polymer solution in a volume of 30 ml was poured into a cylindrical tube having an inner diameter of 2 cm and a length of 18 cm. The test tube was closely stoppered and placed in a dryer of reduced pressure at 70° C. for 4 hours to cause gelation by concentration as well known in the art.

In the test tube taken out from the dryer, gelation was observed on the upper layer portion, whereas the polymer solution was remaining from the middle layer portion to the lower layer portion. This means that it is quite difficult to produce a polymer electrolyte gel having a relatively large thickness in a flame according to the conventional process of gelation by concentration Example 21

Using pure water, an electrolytic solution containing 38 wt % NaSCN was prepared. To this electrolytic solution, a dry powder of an acrylonitrile polymer (Mw: 150,000) made of 10 wt % methyl acrylate and 90 wt % acrylonitrile was added in a proportion of 8.9 wt %. The polymer was dispersed in the solvent by stirring, and the temperature was gradually increased to about 85° C., at which the polymer dissolved in the solvent to give a polymer solution. The preparation of the polymer solution was carried out in a closed system under the conditions that the solvent hardly volatilized.

The polymer solution was spread over the surface of a support (smooth flat plate made of SUS316L) with a 50 μm or 500 μm spacer disposed thereon. The support was covered with a Teflon® sheet and placed in a freezer at −5° C. for 2 hours to give a polymer electrolyte gel. The results of evaluation for the polymer electrolyte gel are shown in Table 7.

Example 22

A polymer electrolyte gel was produced in the same manner as described in Example 21, except that a polymer solution was prepared by the addition of a 7.0 wt % dry powder of an acrylonitrile polymer (Mw: 210,000) made of 4 wt % vinyl acetate and 96 wt % acrylonitrile, which was substituted for the acrylonitrile polymer of Example 21. The results of evaluation for the polymer electrolyte gel are shown in Table 7.

Comparative Example 17

A polymer electrolyte gel was prepared in the same manner as described in Example 21, except that a dry powder of an acrylonitrile polymer (Mw: 210,000) made of 100 wt % acrylonitrile was added in a proportion of 2.8 wt %, which was substituted for the acrylonitrile polymer of Example 21. The results of evaluation for the polymer electrolyte gel are shown in Table 7.

solution containing 1.0 mole/liter $TEABF_4$ was prepared. To this electrolytic solution, a dry powder of an acrylonitrile polymer (Mw: 150,000) made of 4 wt % methyl acrylate and 96 wt % acrylonitrile was added in a proportion of 7.0 wt %. The polymer was dispersed in the solvent by stirring, and the temperature was gradually increased to about 115° C., at which the polymer dissolved in the solvent to give a polymer solution.

The polymer solution was heated to 85° C. and sprayed over the surface of a support (smooth flat plate made of SUS304), which was immediately placedin a freezer at −20° C. and left for 4 hours to prepare a polymer electrolyte gel. The preparation was entirely carried out in a closed system under the conditions that the solvent hardly volatilized.

The polymer electrolyte gel was obtained in various thickness ranging from several micrometers to tens of micrometers by adjusting the number of spraying. In addition, the polymer electrolyte gel retained the shape even at 80° C. and had an ion conductivity of about $5.0 \times 10^{-3}$ S/cm.

Example 24

Ten parts by weight of an acrylonitrile polymer (Mw: 180,000) made of 10 wt % methyl acrylate and 90 wt % acrylonitrile was dissolved in 90 parts by weight of an 48 wt % aqueous solution of sodium rhodanide to prepare a spinning solution, which was subjected to spinning and drawing treatments (total draw ratio was 10 times) by the conventional techniques, followed by drying under an atmosphere at a dry bulb/wet bulb temperature of 120° C./60° C. (the process shrinkage ratio was 14%), resulting in a starting fiber having a filament size of 1.5 d.

The starting fiber was subjected to paper making and calendar treatments by the conventional technique to give a

TABLE 7

| | Acrylonitrile polymer | | | | | | |
|---|---|---|---|---|---|---|---|
| | CoMo[1] | AN content[2] (wt %) | Mw | P conc.[3] (wt %) | Ion conductivity (S/cm) | Thermo-stability test | Strength/-elasticity test |
| Example 21 | methyl acrylate | 90 | 150,000 | 8.9 | $7.5 \times 10^{-1}$ | retention of shape | ○ |
| Example 22 | vinyl acetate | 96 | 210,000 | 7.0 | $8.2 \times 10^{-1}$ | retention of shape | ○ |
| Comparative Example 17 | — | 100 | 210,000 | 2.8 | $8.8 \times 10^{-1}$ | separation | X |

[1]Copolymerizable monomers contained in the acrylonitrile polymer.
[2]Acrylonitrile content in the acrylonitrile polymer.
[3]Acrylonitriie polymer content in the resulting polymer electrolyte gel.

As can be seen from Table 7, the polymer electrolyte gels of Examples 21 and 22 exhibited the "retention of shape" as the result of the thermostability test and had a very high ion conductivity of not lower than $7.5 \times 10^{-1}$ S/cm at 20° C. The polymer electrolyte gels of Examples 21 and 22 further exhibited good results in the strength/elasticity test and it is, therefore, found that they can fully withstand formative working.

In contrast, the acrylonitrile polymer of Comparative Example 17 dissolved in the electrolytic solution only in a small amount at 85° C. The polymer electrolytic gel produced with such an acrylonitrile polymer had high ion conductivity; however, the gel became fragile and caused the separation of liquid components at 80° C.

Example 23

Using a mixed solvent containing propylene carbonate and dimethoxyethane in a molar ratio of 9:1, an electrolytic sheet having a thickness of 20 μm. This sheet was placed on the surface of a support (smooth flat plate made of SUS304), to which the electrolytic solution of Example 1 was added so that the proportion of acrylonitrile polymer contained therein was 7.8 wt %. After the addition of the electrolytic solution, the support was covered with a Teflon® sheet and placed in a freezer at −20° C. for 4 hours to give a polymer electrolyte gel in the shape of a thin film having a thickness of 8 μm.

The resulting polymer electrolyte gel in the shape of a thin film had an ion conductivity of $2.5 \times 10^{-2}$ S/cm and exhibited the "retention of shape" as the result of the thermostability test.

Example 25

A starting fiber made of an acrylonitrile polymer was produced in the same manner as described in Example 24.

The starting fiber was spun and then woven into a fabric having a thickness of 40 μm. The woven fabric was placed on the surface of a support (smooth flat plate made of SUS304), to which the electrolytic solution of Example 1 was added so that the proportion of acrylonitrile polymer contained therein was 7.8 wt %. After the addition of the electrolytic solution, the support was covered with a Teflon® sheet and placed in a freezer at −20° C. for 4 hours to give a polymer electrolyte gel in the shape of a thin film having a thickness of 22 μm.

The resulting polymer electrolyte gel in the shape of a thin film had an ion conductivity of $1.5 \times 10^{-2}$ S/cm and exhibited the "retention of shape" as the result of the thermostability test.

EFFECTS OF THE INVENTION

According to the present invention, thermostable polymer electrolyte gels that have high ion conductivity and can retain the shape of a solid even at high temperatures, e.g., 80° C. or higher. These thermostable electrolyte gels further have suitable elasticity enough for adhesion to electrodes and strength enough to withstand formative working, so that they are useful as the material of small-sized lightweight electrochemical devices in the shape of a thin film, such as metal lithium secondary batteries, electrochromic displays, various sensors and electric double layer condensers. In addition, the thermostable polymer electrolyte gels of the present invention are not limited to the conventional shape of a thin film but can be formed into any shape regardless of their surface area. Thus, there are almost no restrictions imposed on the shape in the production of polymer electrolyte gels.

What is claimed is:

1. A thermostable polymer electrolyte gel comprising an acrylonitrile polymer, an electrolyte and a solvent, the acrylonitrile polymer having an acrylonitrile monomer unit content of from 89 wt % to 98 wt % and meeting the following relationship:

$$1{,}040{,}000-(A \times 10{,}000) \leq B \leq 1{,}490{,}000-(A \times 10{,}000)$$

where A is the acrylonitrile content in wt % and B is the weight average molecular weight of the acrylonitrile polymer;

the polymer electrolyte gel having an ion conductivity of $10^{-3}$ S/cm or higher at 20° C., exhibiting the "retention of shape" in a thermostability test, and containing the acrylonitrile polymer in a proportion of from 3 wt % to 9 wt % based on the total weight of the polymer electrolyte gel.

2. The thermostable polymer electrolyte gel according to claim 1, which is in the shape of a thin film having a thickness of from 1 μm to 500 μm.

3. The thermostable polymer electrolyte gel according to claim 1, wherein the electrolyte contains at least one cation of selected from the group consisting of a lithium ion and a quaternary ammonium ion, and the solvent is an organic solvent.

* * * * *